United States Patent [19]

Annegarn et al.

[11] Patent Number: 4,636,864
[45] Date of Patent: Jan. 13, 1987

[54] TELEVISION RECEIVER COMPRISING A CIRCUIT FOR SEQUENTIALLY TUNING THE RECEIVER TO DIFFERENT FREQUENCIES

[75] Inventors: Marcellinus J. J. C. Annegarn; Petrus W. G. Welles, both of Eindhoven, Netherlands

[73] Assignee: U. S. Philips Corporation, New York, N.Y.

[21] Appl. No.: 514,132

[22] Filed: Jul. 15, 1983

[30] Foreign Application Priority Data

Aug. 23, 1982 [NL] Netherlands ........................ 8203282

[51] Int. Cl.⁴ ...................... H04N 5/262; H04N 5/445
[52] U.S. Cl. .................................. 358/191.1; 358/22; 358/183
[58] Field of Search ...................... 358/191.1, 188, 183, 358/182, 148, 22, 185

[56] References Cited

U.S. PATENT DOCUMENTS

| | | | |
|---|---|---|---|
| 4,101,930 | 7/1978 | Sanders | 358/183 |
| 4,172,264 | 10/1979 | Taylor | 358/22 |
| 4,218,710 | 8/1980 | Kashigi | 358/22 |
| 4,259,690 | 3/1981 | Nakanishi | 358/191.1 |
| 4,266,242 | 5/1981 | McCoy | 358/183 |
| 4,360,831 | 11/1982 | Kellar | 358/183 |

FOREIGN PATENT DOCUMENTS 1495173 12/1977 United Kingdom .

OTHER PUBLICATIONS

Fully Digitalized Color Picture in Picture Television System, by Michio Masuda, et al., IEEE Transactions on Consumer Electronics, vol. CE-25, Feb. 1979, pp. 152-159.

Primary Examiner—Tommy P. Chin
Attorney, Agent, or Firm—Thomas A. Briody; Jack Oisher; William J. Streeter

[57] ABSTRACT

In a television receiver, comprising a tuning portion (1) which operates in time-division multiplex and a first memory circuit (41) for storing sub-picture information from different transmissions obtained during a tuning cycle, a second memory circuit (57) is provided for acquiring the sub-picture information from the first memory circuit (41) in one single operation and for displaying (at 65) during a next tuning cycle a composite picture in which no change of picture content occurs.

2 Claims, 1 Drawing Figure

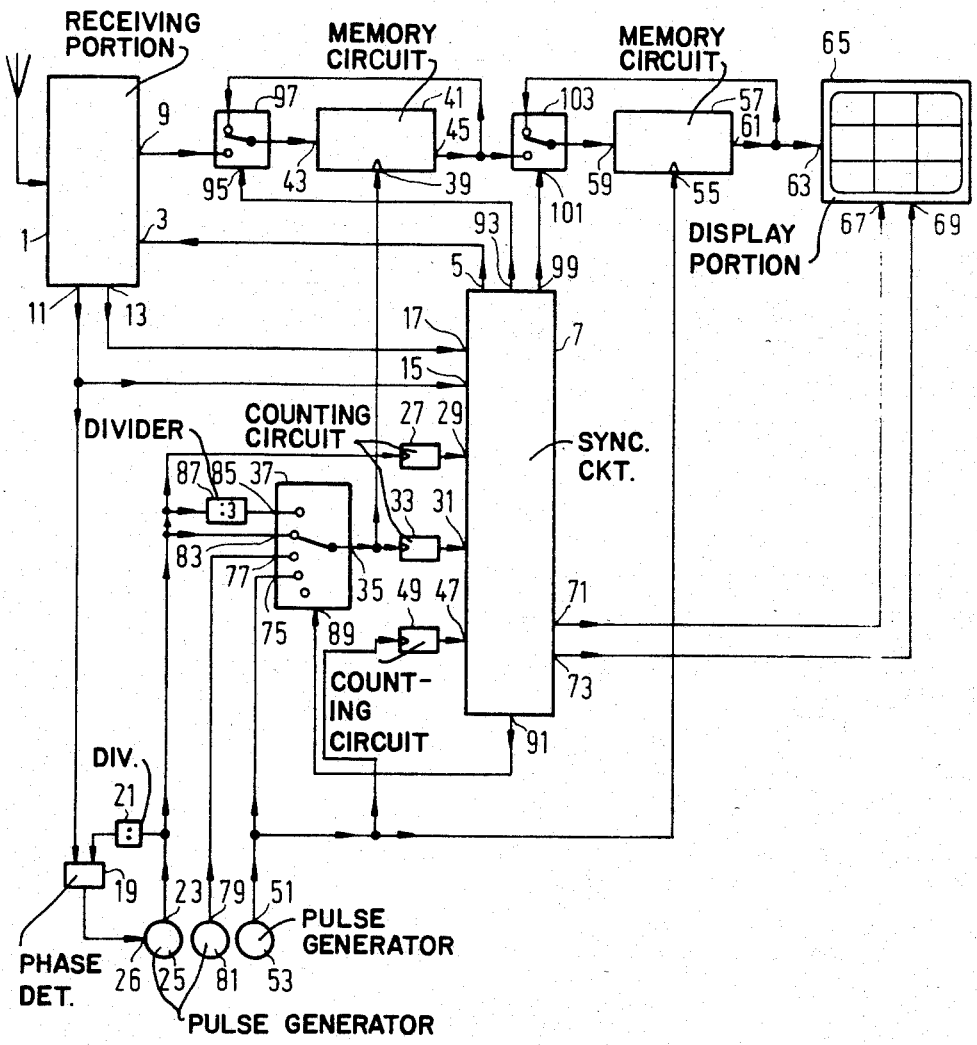

TELEVISION RECEIVER COMPRISING A CIRCUIT FOR SEQUENTIALLY TUNING THE RECEIVER TO DIFFERENT FREQUENCIES

BACKGROUND OF THE INVENTION

The invention relates to a television receiver comprising a circuit for sequentially tuning the receiver to different frequencies and displaying a composite picture comprising a group of sub-pictures which correspond to pictures transmitted by transmitters received at the said different frequencies, the receiver comprising a memory circuit for storing sub-picture information.

DT-AS 2 413 839 discloses the possibility to obtain such a television receiver.

SUMMARY OF THE INVENTION

The invention has for its object to provide an advantageous construction of such a television receiver.

According to the invention, a television receiver of the type described in the opening paragraph, is characterized in that the receiver comprises a second memory circuit which is capable of being coupled to the first-mentioned memory circuit for acquiring from the first-mentioned memory circuit the sub-picture information from a group of transmissions, which sub-picture information is obtained during the sequential tuning operation, and for displaying the group of sub-pictures associated with the group of transmissions in such a way from the second memory circuit that with a further sequential tuning of the receiver to different frequencies these groups of sub-pictures in a composite picture can simultaneously change their picture content.

As a result thereof, a television receiver in accordance with the invention provides a composite picture which gives a survey of still pictures of receivable programs, the composite picture producing a restful impression.

DESCRIPTION OF THE DRAWING

The invention will now be further described by way of example with reference to the drawing which comprises only one FIGURE.

The FIGURE illustrates by means of a concise block diagram a television receiver in accordance with the invention.

DESCRIPTION OF THE PREFERRED EMBODIMENT

The tuning of a receiving portion 1 is periodically, for example after every 300 msec., changed to a different frequency in response to a signal combination received from an output combination 5 of a synchronizing circuit 7 and applied to an input combination 3. This is effected, for example, nine times, whereafter this tuning cycle is repeated.

Some time after the tuning has been changed, the control sections in the receiving portion 1 have settled and a video signal appears at an output 9, a horizontal synchronizing signal at an output 11, and at an output 13 a vertical synchronizing signal from a transmission which is received at the frequency to which the receiver is tuned. The synchronizing signals are applied to two inputs 15 and 17, respectively, of the synchronizing circuit 7.

In addition, the horizontal synchronizing signal is applied to a frequency and phase detector 19, to which also a signal coming from an output 23 of a first pulse generator 25 is applied via a frequency divider 21. The frequency and phase detector 19 applies a control signal to a control signal input 26 of the first pulse generator 25, in response to which the first pulse generator 25 is synchronized with the horizontal synchronizing signal.

The output 23 of the first pulse generator 25 is further connected to a counting signal input of a first counting circuit 27, an output combination of which is connected to an input combination 29 of the synchronizing circuit 7.

The first counting circuit 27 applies to the input combination 29 of the synchronizing circuit 7 information about the position of the picture element from which corresponding video information is received at that moment.

An input combination 31 of the synchronizing circuit 7 receives from a second counting circuit 33, whose counting signal input is connected to an output 35 of a change-over circuit 37 and to a clock signal input 39 of a first memory circuit 41, information about the position in the first memory circuit 41 of a signal combination of a video signal sample which must be written into or read from, respectively, the first memory circuit 41, which signal combination is applied to an input combination 43 of this memory circuit 41 or is to be taken off from an output combination 45 thereof.

An input combination 47 of the synchronizing circuit 7 receives from a third counting circuit 49, whose counting signal input is connected to an output 51 of a second pulse generator 53 and to a clock signal input 55 of a second memory circuit 57, information about the position in the second memory circuit 57 of a signal combination applied to an input combination 59 or to be taken from an output combination 61 thereof.

The output combination 61 of the second memory circuit 57 applies a video signal to be displayed to an input combination 63 of a display portion 65. Horizontal and vertical synchronizing signals, respectively, received from outputs 71 and 73, respectively, of the synchronizing circuit 7 are applied to inputs 67 and 69, respectively, of the display portion 65. As a result thereof, the scanning of the picture display portion is coupled to the scanning of the second memory circuit 57.

In addition, the output 51 of the second pulse generator 53 is connected to an input 75 of the change-over circuit 37, an input 77 of which is connected to an output 79 of a third pulse generator 81, an input 83 to the output 23 of the first pulse generator 25 and an input 85, via a divide-by-three frequency divider 87, also to the output 23 of the first pulse generator 25.

The change-over circuit 37 is controlled by a signal combination applied to its input combination 89, which signal combination is received from an output combination 91 of the synchronizing circuit 7.

In addition, the synchronizing circuit 7 has an output 93 which applies to an input 95 of a change-over switch 97, a signal which can move this change-over switch 93 to the position shown or to the position not shown, and an output 99 which applies to an input 101 of a change-over switch 103, a signal which can adjust this change-over switch 103 to the position shown or to the position not shown.

The change-over switch 97 connects the input 43 of the first memory circuit 41 to its output 45 or to the output 9 of the receiving portion 1. The change-over switch 103 connects the input 59 of the second memory circuit 57 to its output 61 or to the output 45 of the first memory circuit 41.

The memory circuits 41 and 57 are of a serial type, such as, for example, bucket-brigade memories or change-coupled devices. The signals to be processed thereby are assumed to be digital signals. If the memories are not written-in, as when the change-over switches 97 and 103 and the change-over circuit 37 are in the positions shown, in which the input 83 of the change-over circuit 37 is connected to the output 35, the information circulates in the memories 41 and 57.

The first, second and third counting circuits 27, 33, 49 may be identical.

If, after turning the receiver to a new frequency, the control actions of the receiver have settled, the change-over circuit 37 position is changed by the synchronizing circuit 7, as a result of which its input 77 is connected to the output 35 and the clock signal from the third pulse generator 81 is applied to the first memory circuit 41 and to the second counting circuit 33. The frequency of this clock signal differs from the frequency of the signal supplied by the first pulse generator 25, so that the first memory circuit 41 and the second counting circuit 33 are then no longer synchronous with the scan in the received television signal.

When the counting position of the second counting circuit 33 differs by a given amount from the position of the first counting circuit 27, the synchronizing circuit 7 connects the output 35 of the change-over circuit 37 to the input 83, so that the two counting circuits are supplied with the same counting signal and the position of the second counting circuit 33 continues to differ always by the same amount from the position of the first counting circuit 27. This amount depends on the position the sub-picture information to be written into the first memory circuit 41 must occupy in the composite picture.

At the next vertical synchronizing pulse at the input 17 of the synchronizing circuit 7, this synchronizing circuit 7 connects the input 85 of the change-over circuit 37 to the output 35 thereof and the change-over switch 97 is adjusted to the position not shown. As a result thereof, the video signal from the transmission which has been tuned to, is written in the correct sub-picture position in the first memory circuit 41. This writing operation is effected at one third of the frequency of the pulse generator 25 and, in addition, every time following a horizontal deflection period during which the first memory circuit 41 has been written-in, no writing operation is effected during two horizontal deflection periods, so that the information of a sub-picture occupies only one-ninth of the storage capacity of the memory circuit 41 and, consequently, nine sub-pictures can be stored in the memory circuit 41 and subsequently displayed in the composite picture. It will be obvious that this number is optional.

If no vertical synchronizing pulse were to occur because no transmission is received, a final-position signal from the first counting circuit 27 is then used as a starting signal for the writing operation. In both cases this final-position signal also ends the writing operation, as a result of which the input 83 of the change-over circuit 37 is again connected to the output 35 and the change-over switch 97 is again adjusted to the position shown, so that, controlled by one third of the frequency of the pulse generator 25, the information in the memory circuit 41 circulates up to the beginning of the next horizontal deflection period to be written in, so that it can again be written into the proper position.

Thereafter the next frequency is tuned to by the synchronizing circuit 7 and the synchronizing and writing cycle is repeated.

This happens nine times until all the sub-picture positions in the first memory circuit 41 have been filled.

Then the first memory circuit 41 is synchronized with the second memory circuit on account of the fact that the synchronizing circuit 7 connects the input 77 of the change-over circuit 37 to the output 35 until the positions of the second and third counting circuit 33 and 49, respectively, are equal, whereafter the input 75 of the change-over circuit 37 is connected to the output 35. At the start of a counting cycle of the third counting circuit 49, the change-over switch 103 is then adjusted to the position not shown, until the end of that counting cycle. The nine items of sub-picture information contained in the first memory circuit are then transferred to the second memory circuit 57 and displayed during the next counting cycles, the change-over switch 103 being again in the position shown.

The displayed composite picture now only shows a change once in each tuning cycle and produces a much more restful impression than for the case when a second memory circuit is not used.

Although memory circuits of the serial type are used in the embodiment described, it will be obvious that if so desired other types of memory circuits may alternatively be used.

It will further be obvious that if so desired the displayed information may be simultaneously changed in only a portion of the composite picture with a group of sub-pictures associated with a group of transmissions.

The sequence in which different transmisson frequencies are tuned to in a tuning cycle may if so desired be chosen such that the sequence of the sub-pictures corresponds, for example, to an array of switches in a program selection device.

It is further possible, for example, when a program selection device makes it possible to tune to a greater number of transmitter frequencies than the maximum number of sub-pictures possible in the composite picture, to periodically cause a shift of the sub-pictures, as a result of which a then unoccupied portion of the composite picture may be occupied by subpictures associated with further transmission frequencies.

What is claimed is:

1. A television receiver comprising display means and a circuit for sequentially tuning the receiver to different frequencies and for displaying on said display means a composite picture comprising a group of sub-pictures which correspond to pictures derived from transmissions sequentially received at said different frequencies, the receiver comprising a first memory circuit for selectively storing information corresponding to said group of sub-pictures, characterized in that the receiver further comprises a second memory circuit selectively coupled to said first memory circuit for receiving from the first memory circuit said information corresponding to said group of sub-pictures, and for repeatedly providing said information to said display means for display as said composite picture, whereby while said second memory circuit is repeatedly providing said information, said first memory circuit is storing new information corresponding to a new group of sub-pictures, thereby enabling on display the simultaneous changing of the picture content of the sub-pictures in the composite picture.

2. A television receiver as claimed in claim 1, characterized in that said receiver further comprises first, second and third pulse generators; means for separating synchronizing signals from the transmissions being sequentially received; means coupled to said separating means for synchronizing said first pulse generator with the synchronizing signals contained in the transmissions being sequentially received; first, second and third counting circuits each having count outputs, said first and third counting circuits being coupled, respectively, to said first and third pulse generators; a change-over device having inputs coupled, respectively, to said pulse generators, an output coupled to said second counting circuit, and a control input; said first and second memory circuits having clock inputs coupled, respectively, to said change-over device output and said third pulse generator; and a synchronizing circuit coupled to said separating means and the count outputs of said counting circuits for generating switching signals for the control input of said change-over device and for said circuit for sequentially tuning said receiver, and for generating synchronizing signals for said display means, wherein the count in the first counting circuit represents a position in a picture frame of the picture information being received, the count in the second counting circuit represents a memory position in the first memory circuit, and the count in the third counting circuit represents a memory position in the second memory circuit.

* * * * *